PROCESS FOR THE RAPID REMOVAL OF SULPHUR AND SILICON FROM PIG IRON

John H. Richards, Baldwin Borough, Pa., assignor to United States Steel Corporation, a corporation of New Jersey No Drawing. Application November 23, 1953, Serial No. 393,966

6 Claims. (Cl. 75—52)

This invention relates to a method for rapidly reducing the sulphur and silicon content of pig iron.

While sulphur can be removed to some degree in any basic steel making process, the special conditions necessary to the effective elimination of this element are generally in variance with those required for the removal of certain other metalloids, particularly phosphorus and silicon. The problems posed have been met heretofore by special double slagging practices in the case of alloy steels; in the case of tonnage steels, the only practical solution has been rigid control of blast furnace operations to produce low sulphur pig iron. Both expedients are costly.

More recently the decreased availability of high grade iron ores has increased the difficulty of maintaining high production rates without impairing the quality of the iron, especially with respect to its silicon and sulphur contents. This has further complicated the economics of the steel making operations in that heavier charges of ore and limestone have been required in the open hearth; thus increasing the drossing burden and heat requirements and reducing the steel yield.

Accordingly it is an object of the present invention to provide an economical method of rapidly reducing, externally of the blast furnace, the sulphur and silicon content of pig iron to provide an iron more readily handled in existing steel making processes.

This and other objects will be apparent from the following specification.

The technical literature dealing with sulphur in iron and steel shows the following: effective sulphur elimination requires (1) a reducing or neutral environment with respect to iron; (2) a highly basic slag, i. e., one having a ratio of basic to acidic oxides of at least 2:1, to hold the sulphur; and (3) the transfer of silicon from the metal to silica in the slag must be avoided or minimized.

The precepts have been the basis of all practices heretofore proposed for the removal of this element. They impose certain economic disadvantages, e. g., the requirement of a highly basic slag results in absorption of large amounts of iron oxide and consequently high iron losses; the melting of a limey slag requires large quantities of heat. These factors have been accepted as necessary evils to effective sulphur removal. It will also be noted that the presently accepted concepts preclude the removal of sulphur and silicon within a common time period.

The usual iron refining process is primarily directed to approaching equilibria relationships between carbon and oxygen in iron and under such conditions the aforementioned concepts are undoubtedly correct. However, the fugacity of sulphur in iron is at a maximum when the iron is substantially saturated with carbon. The present process contemplates preserving this condition, i. e., establishing and maintaining conditions whereby sulphur and silicon are removed without substantially decreasing the carbon content of the iron. The latter is extremely important to the realization of the full benefits of the invention; irons containing 3.75% or more carbon being particularly amendable to the treatment, while the effectiveness thereof decreases sharply at carbons below about 3%. Fortunately all blast furnace iron normally contains between 3 and 4.5% carbon; thus pre-regulation of carbon content would be required only under very unusual circumstances if ever.

Briefly, the process comprises treating a batch of molten pig iron of a particular carbon, manganese and silicon content with air and a molten, neutral slag, the former being introduced under rigorously controlled conditions whereby oxidation of carbon is substantially avoided. Very short treating times are requisite to minimize heat losses, the heat available being limited to that supplied by oxidation of silicon and manganese. This necessitates the use of a low melting range slag and precludes slags rich in lime. Ferrous and/or manganese oxide rather than high basicity in the slag are depended upon to remove sulphur. These several factors combine to permit sulphur and silicon to be removed from the pig iron simultaneously.

In practicing my invention, I first prepare a synthetic slag by melting together proportions of lime, silica and ferrous and/or manganese oxides to provide a substantially neutral but highly oxidizing composition having a melting range below 1250° C. Proportions which provide the required combination of properties are:

CaO _____ 25–40% by weight.
SiO₂ _____ 1.07 times the weight of lime.
FeO and/or MnO ____ balance, but in no case less than 10% by weight of the mixture.

Magnesium oxide may be substituted for CaO within the above range, but must not exceed either the lime content or 14% of the total weight of the slag. Alumina may be substituted for up to 20% of the silica, but the Al₂O₃ must not exceed 6%. The foregoing definition contemplates slag compositions in which the molar ratio of strongly basic oxides to strongly acidic oxides falls within the range of about 1:1 to 1.1:1 and in which the total of the oxidizing constituent, FeO and/or MnO, is within a range of 10–50% as illustrated in the following table.

| | | | | | | | | |
|---|---|---|---|---|---|---|---|---|
| CaO _____percent (by weight)_ | 25 | 40 | 12½ | 12½ | 26 | 26 | 25 | 13½ |
| MgO _____do___ | | | 12½ | 12½ | 14 | 14 | | 13½ |
| SiO _____do___ | 27 | 43 | 30 | 27 | 44 | 49 | 21½ | 33 |
| Al₂O₃ _____do___ | | | | 6 | 6 | | 5½ | |
| FeO and/or MnO _____do___ | 48 | 17 | 45 | 42 | 10 | 11 | 48 | 50 |
| Molar ratio—basic:acidic oxides | 1:1 | 1:1 | 1:1 | 1:1 | 1.03:1 | 1.1:1 | 1.08:1 | 1.05:1 |

The above illustrate nominal limits of composition of slags suitable to my purposes. Compositions in which the oxidizing component is toward the top of the range, i. e., is about 40%, however, give somewhat better results; further, while all FeO or all MnO may be used, slags containing mixtures of these materials are somewhat easier to prepare. Accordingly, as a specific example of my practices, I prefer a slag of approximately the following composition:

Percent by weight
MnO _____ 17
FeO _____ 23
Al₂O₃ _____ 3
SiO₂ _____ 28
MgO _____ 4
CaO _____ 25
Molar ratio basic: acidic 1.1:1 oxides While slags of the above character, because of their low basicity have heretofore been considered ineffective for sulphur elimination, they will take up and hold at least for a limited time, considerable quantities of sulphur provided absorption of silica is avoided. While the latter is impossible in a process which contemplates the rapid oxidation of silicon, I have found the effects of silica absorption can be offset by oxidizing an equal or greater quantity of manganese. Accordingly, having prepared a suitable slag, I next examine the analysis of pig iron to be treated and if necessary adjust its manganese content to provide a minimum ratio of Mn to Si of 1.2:1, by the addition of ferromanganese or the like. I then charge a quantity of the iron in the molten condition into a suitable basic lined vessel and for each ton of iron charged, add to the vessel between 25 and 100 lbs. of the prepared slag also in the molten condition. The slag can be used successfully as regards sulphur and silicon removal in the dry, granular form, however, metal losses are increased and the final temperature of the treated iron is lowered by such practice. The value, 25 lbs. of slag per ton of iron charged, represents the minimum for effective treatment. Increasing the slag volume beyond this amount provides a larger reservoir to receive sulphur and to this extent facilitates the removal of this element. It is desirable therefore to use somewhat more than the minimum amount of slag particularly when treating high sulphur irons. A large volume of slag, however, is not needed and is undesirable from a cost standpoint. The upper limit of 100 lbs. of slag per ton of iron charged is set on this basis. For the usual grades of pig iron processed, the use of about 35 lbs. of slag per ton represents an optimum practice. Immediately upon completion of the charging operation, I subject the iron and slag to the action of one or more jets of air directed against the surface thereof. This serves the twofold purpose of violently intermixing the slag and metal to cause the former to absorb sulphur from the latter and at the same time oxidizing the silicon and manganese to remove these metalloids and maintain or increase the bath temperature. To accomplish both these results the blowing must be conducted under exacting conditions. To effectively remove sulphur the intermixing must be maintained for at least three minutes but not more than about seven minutes can be allowed; the latter being about the maximum time that conditions favorable to sulphur absorption by slags of the character used in the process can be maintained and the process made self sufficient as regards heat. That is, the oxidation of silicon and manganese must be completed within the limited time both to provide necessary heat and to avoid substantial oxidation of carbon. As previously mentioned, lowering the carbon content of iron adversely affects the fugacity of sulphur and must be avoided in the present method. To avoid carbon oxidation it is also necessary that the air jets do not penetrate or pass through the iron since this establishes a rate of transfer of oxygen to the metal which is greater than the rate of utilization of oxygen in burning silicon and manganese, and thus provides an excess of oxygen to react with carbon. These rather conflicting requirements are met by supplying air in jets or a jet having sufficient kinetic energy to plow through the slag-metal interface but insufficient to depress the metal to a depth of more than one jet diameter. On this basis, several factors become important: (1) the delivery end of the jet must be not more than approximately one jet diameter above the bath surface; jets other than those of circular cross section should be positioned on the basis of Reynolds similitude criteria; (2) the velocity of the jet must be within the range 300–500 F. P. S.; and (3) the size and number of jets must be proportioned to deliver the required amount of air within the time limits and within the above velocity range.

The angle of jet to the surface is also of some importance. Angles greater than about 25° tend toward boring of the air jets into the metal; whereas angles less than about 5° tend to increase air requirements and have an undesired cooling effect. The amount of air required is readily calculated from the silicon and manganese content of the pig iron. However, considerably more than the theoretical amount of oxygen to completely remove these metalloids is needed. This derives from the necessity of using non-penetrating, impinging jets which are considerably less efficient than for example jets introduced below the metal surface. For this reason, provision must be made to supply about three times the theoretical oxygen required for the silicon and manganese oxidation. In practice, this will average about 5000 C. F. of air per ton of iron charged. Since the sulphur holding ability of the substantially neutral slags used in the method is decreased by virtue of subsequent carbon reaction with iron oxide when the slag and metal are quiescent, it is essential that the metal be poured immediately upon completion of the treatment and the slag separated therefrom.

From the foregoing discussion, it is evident that my process is not applicable to all pig iron. The iron must approach saturation with respect to carbon and the manganese to silicon ratio must be at least 1.2:1. The removal of silicon and manganese increases the melting point of the iron and heat is required to maintain the charge molten; in addition heat losses incident to transportation of the iron from the blast furnace to the treating vessel and hence to the ultimate refining furnace must be offset. These additional considerations fix the minimum silicon content of the iron at about 0.5% which in turn fixes the minimum manganese at at least 0.6% or 1.2 times the silicon. Further, the process, in common with other known methods, is capable of removing only about 40% of the sulphur, which places a practical limit of about 0.06% on this element in the iron to be treated. The limit of 0.06% sulphur, however, is considerably more than permissible in blast furnace iron under present practices and therefore avoids costly special blast furnace operating practices heretofore necessary. Phosphorus content of the iron is immaterial, i. e., although some phosphorus may be removed in this process it does not influence the desired removal of sulphur and silicon. Accordingly the only limits of phosphorus are those imposed by considerations arising in the ultimate use of iron. The latter usually limit phosphorus to .10–0.8.

To illustrate operations under my invention, I mix together lime, magnesia, silica, alumina, ferrous and manganese oxides in the following quantities:

| | Percent by weight |
|---|---|
| CaO | 25 |
| MgO | 4 |
| $SiO_2$ | 28 |
| $Al_2O_3$ | 3 |
| FeO | 23 |
| MnO | 17 |

These materials are melted together and maintained molten in a suitable vessel, arranged so that quantities thereof can be withdrawn from time to time as needed.

I then examine the analysis of the iron from the blast furnace and if the ratio of manganese to silicon therein is below 1.2:1, I add sufficient ferromanganese to increase the manganese content to provide this minimum ratio. A quantity of the iron is then charged into a suitable vessel, for example, one having a basic lined hearth and a series of four inch diameter tuyeres positioned along one side thereof and inclined toward the hearth to direct air at an angle of about 20° against the surface of the bath in the vessel. A sufficient quantity of iron is charged into the vessel to establish the bath level within about one jet diameter of the mouth of these tuyeres. I then immediately charge about 35 lbs. of the preformed molten slag per ton of iron into the vessel and immediately introduce 5000 C. F. of air through the tuyeres in a period of about six minutes. The number of tuyeres is fixed in the design of the vessel to deliver this quantity of air within a time of five to seven minutes as a velocity within the range 300 to 500 F. P. S. At the end of the six minute period I discontinue the air blast, pour the charge and separate the slag therefrom. Such operation removes approximately 40% of the sulphur originally present in the pig iron and at least 80% of the silicon and manganese; the exact results depending to some extent on the original analysis of the pig iron. Carbon and phosphorus may also be reduced slightly but essentially remain in their original amounts. The treatment raises the temperature of the iron 200 to 300°. The temperature of the iron should be no lower than about 2500° F. when charged to achieve suitable final temperature. The treated iron can then be transported to a mixer as is the usual practice; hence quantities withdrawn from time to time for refining in any of the usual refining furnaces.

While I have shown and described certain specific embodiments of my invention, I do not wish to be limited exactly thereto except as defined by the scope of the appended claims.

I claim:

1. A method of simultaneously removing sulphur and silicon from molten pig iron substantially saturated with carbon and containing at least a 1.2 to 1 ratio of manganese to silicon, comprising charging a quantity of such iron into a basic-lined vessel, charging into said vessel at least 25 lbs. per ton of iron charged of preformed, substantially neutral lime-silica slag having a melting range below 1250° C. whereby to form a bath of iron and slag, said slag containing sufficient quantity of an oxide selected from the group consisting of ferrous oxide, manganese oxide and mixtures of ferrous and manganese oxides to absorb and hold sulphur when said slag is intermixed with sulphur containing iron, and intermixing said iron and slag for between three and seven minutes by means of a blast of at least one jet of oxygen containing gas directed onto the surface of said bath and delivering to said surface sufficient oxygen to oxidize the silicon and manganese in the metal during said time, said jet having sufficient kinetic energy to plow through the slag without depressing the metal surface more than one jet diameter to oxidize the silicon and manganese in the metal without substantially oxidizing any carbon and to cause the slag to take up sulphur so that silicon and sulphur are simultaneously removed from the iron.

2. A method of simultaneously removing sulphur and silicon from molten pig iron saturated with carbon and containing manganese and silicon in a ratio of at least 1.2 to 1, comprising charging a quantity of such iron into a basic-lined vessel, charging into said vessel at least 25 lbs. per ton of iron charged of preformed slag whereby to form a bath of iron and slag, said slag being composed of 10 to 50% by weight of an oxide selected from the group consisting of ferrous oxide, manganese oxide and mixtures of ferrous and manganese oxides, and the balance, a mixture of strongly basic oxide and strongly acidic oxide in substantially equimolar proportions, said strongly basic oxide being selected from the group consisting of calcium oxide and mixtures of calcium and magnesium oxides in which the weight of magnesium oxide does not exceed the weight of calcium oxide nor 14% of the weight of the total slag, said acidic oxides being selected from the group consisting of silica and mixtures of silica and alumina in which the alumina does not exceed 20% of the weight of silica nor 6% of the total weight of the slag, and introducing into said vessel and against the surface of said bath approximately three times the theoretical quantity of oxygen needed to substantially completely oxidize the silicon and manganese in the metal by means of a blast of at least one jet of oxygen containing gas, said jet introducing said quantity of oxygen during a period of not less than three and not more than seven minutes at a jet velocity of between 300 and 500 F. P. S. and at a point not more than approximately one jet diameter above the surface of the bath whereby the slag and metal are violently intermixed and the oxidation of silicon affected without substantial oxidation of carbon to remove sulphur and silicon from the iron simultaneously.

3. A method of simultaneously reducing the sulphur and silicon contents of pig iron substantially saturated with carbon and containing manganese in a ratio of 1.2 to 1 relative to the silicon content, which consists in charging molten iron into a basic-lined vessel, covering the iron with a substantially neutral lime-silica slag having a melting range below 1250° C., said slag including also sulphur-absorbing ingredient selected from the group consisting of ferrous oxide, manganese oxide and mixtures thereof in amount between 10–50% by weight of the slag, surface-blowing said slag with oxygen-containing gas for a few minutes, until the oxygen partially oxidizes the silicon and manganese contents of the liquid iron, and terminating the blow before the carbon content is oxidized to a substantial extent, thereby causing a portion of the silicon and sulphur of the iron to combine with the slag.

4. The method defined by claim 3 characterized by said slag covering amounting to from 25 to 100 lbs. per ton of iron.

5. The method defined by claim 3 characterized by surface-blowing the slag with about 5000 C. F. of atmospheric air per ton.

6. The method defined by claim 3 characterized by blowing said gas through the slag and into contact with the surface of the liquid metal.

References Cited in the file of this patent

FOREIGN PATENTS

943    Great Britain _____ of 1887